United States Patent [19]

Eisenzimmer et al.

[11] Patent Number: 4,688,605
[45] Date of Patent: Aug. 25, 1987

[54] REINFORCED HOSE STRUCTURE

[75] Inventors: George W. Eisenzimmer; Robert C. Schisler, both of Akron, Ohio

[73] Assignee: The Goodyear Tire & Rubber Company, Akron, Ohio

[21] Appl. No.: 238,263

[22] Filed: Feb. 25, 1981

[51] Int. Cl.$^4$ .............................................. F16L 11/08
[52] U.S. Cl. .................................... 138/130; 138/177; 138/DIG. 2; 525/263
[58] Field of Search ............... 138/126, 130, 177, 178, 138/DIG. 2; 525/139, 263

[56] References Cited

U.S. PATENT DOCUMENTS

| 2,470,599 | 5/1949 | Billmeyer | 138/130 X |
|---|---|---|---|
| 2,783,214 | 2/1957 | Homan | 138/177 X |
| 3,212,528 | 10/1965 | Haas | 138/130 |
| 3,638,702 | 2/1972 | Sndter | 525/139 X |
| 3,687,719 | 8/1972 | Klotzer et al. | 525/139 X |
| 3,738,948 | 6/1973 | Dunnom | 525/139 X |
| 3,746,669 | 7/1973 | Dunnom et al. | 525/139 X |
| 3,821,133 | 6/1974 | Doran et al. | 525/139 X |
| 3,866,633 | 2/1975 | Taylor | 138/130 |
| 4,014,827 | 3/1977 | Hart et al. | 525/139 X |
| 4,257,926 | 3/1981 | Tanimura et al. | 525/139 X |
| 4,285,381 | 8/1981 | Furukawa et al. | 525/139 X |
| 4,294,732 | 10/1981 | Ohyachi et al. | 525/139 X |

Primary Examiner—James E. Bryant, III
Attorney, Agent, or Firm—R. D. Thompson

[57] ABSTRACT

A hose structure of simplified construction suitable for rigorous high pressure applications such as rotary well-drilling apparatus is described. The hose includes a heavy-walled tube of elastomeric material having a measured stress of at least 600 psi at 20 percent elongation, an elongation at rupture of at least 150 percent and a Young's modulus of at least 2000 psi. The formulation of the tube material includes a reactive resin system capable of polymerizing in situ.

7 Claims, 1 Drawing Figure

U.S. Patent   Aug. 25, 1987   4,688,605
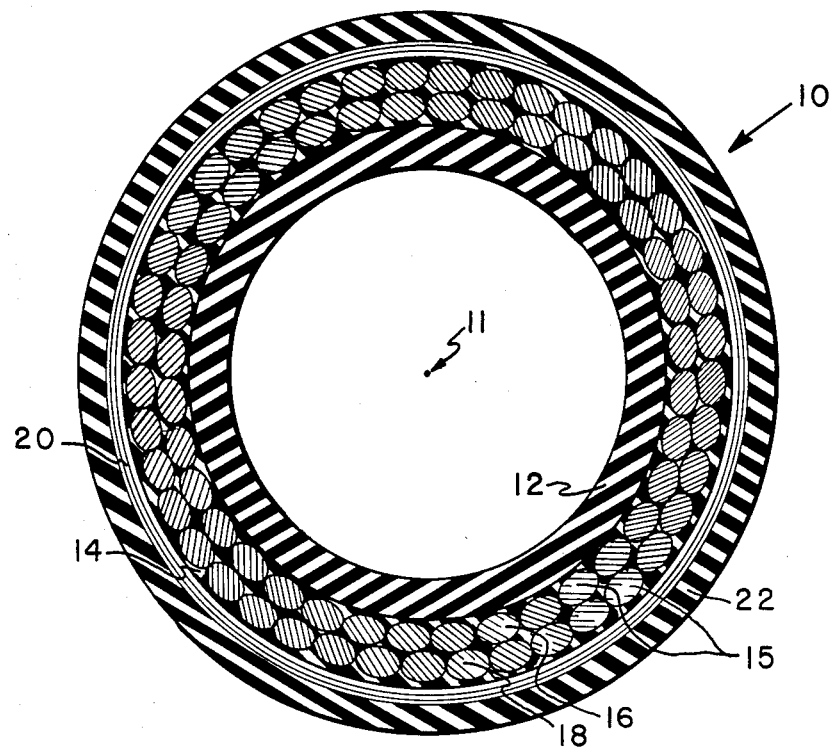

REINFORCED HOSE STRUCTURE

The abstract is not to be taken as limiting the invention of this application and in order to understand the full nature and extent of the technical disclosure of this application reference must be made to the accompanying drawing and the following detailed description.

The invention pertains to a reinforced hose structure and particularly to a hose structure suitable for use in high pressure applications such as may occur on rotary well-drilling machines, although not limited thereto.

Hose of relatively large diameter, for example, 2 to 4 inches internal diameter, are commonly used to transport or convey drilling fluids or muds in well-drilling machines. These hose must be capable of withstanding considerable internal pressure, for example, from about 5,000 to in excess of 20,000 pounds per square inch, and must be flexible enough to couple the standpipe of the drilling derrick to the kelly which moves downwardly with the drill pipe as drilling proceeds and is raised to permit attachment of each section of drill pipe. Present hose constructions for this and other high pressure applications typically include a radially innermost tube of elastomeric material and one or more plies of textile fabric as a reinforcement for the elastomeric tube. These plies reinforce the tube to prevent the tube from being pushed out between the main reinforcing cables of such hose, particularly where the hose is bent to a relatively small radius, thus causing the main cables to be spread apart relative to one another along that part of the hose wall which is most distant from the center of curvature of the bend.

According to the present invention, there is provided a reinforced hose structure which is greatly simplified when compared to known hose structures which are able to meet the stringent requirements of rotary drilling operations.

The invention is illustrated in the accompanying drawing in which FIG. 1 is a cross-sectional view of a hose structure according to the invention.

Referring now to FIG. 1, there is shown a preferred embodiment of a hose structure 10 according to the invention. Proceeding from the inside to the outside of said hose there is provided nearest the longitudinal axis 11 a tube 12 of elastomeric material having properties which will be further described herein. Immediately radially outwardly of the tube 12 there are provided at least two layers 16 and 18 of steel cables 15. The layers 16,18 of cables are embedded in elastomer material 14. Overlying the layers 16,18 of helically extending steel cables 15 are one or more plies 20 of rubberized textile material. Overlying the textile plies 20 is a cover 22 of elastomeric material which forms the radially outermost surface of the hose.

Rotary drilling hose commonly experiences high pulsating pressures, abrasive muds, air, water, and hydrocarbon fluids. These factors must be kept in mind in selecting the elastomer of which the tube 12 is to be compounded. An acrylonitrile/butadiene rubber-based elastomeric material is particularly suitable for this application, although other elastomers, including acrylonitrile-isoprene copolymers, styrene-butadiene copolymers, polyisoprenes, polychloroprenes, or blends of these may be employed, depending on the nature of the fluid intended to be conveyed through the hose and the chemical resistance thus required of the tube elastomer.

The elastomeric material of the tube 12 preferably has a tensile stress of at least 600 psi at 20 percent elongation when measured according to ASTM method D-412 and elongation at rupture of at least 150 percent when measured according to ASTM method D-412, and a Young's modulus of at least 2000 psi when measured according to ASTM method D-1053, and more preferably has a tensile stress of at least about 1000 psi at 20 percent elongation when measured according to ASTM method D-412 and an elongation at rupture of at least 200 percent when measured according to ASTM method D-412, and a Young's modulus of at least 3500 psi when measured according to ASTM method D-1053.

In hose suited for high pressure rotary drilling apparatus, the tube 12 should have a thickness of at least 3/16 inch as measured along a radius of the hose 10 proceeding from the longitudinal axis 11.

The requisite physical properties as herein described for the elastomeric material of the tube 12 may be obtained with compounds based on elastomers selected from the group given hereinbefore in combination with a reactive resin system capable of polymerizing in situ within the compounds. These resin systems will be further described herein.

For use in rotary drilling applications, an elastomeric compound of the following general formulation exhibits the requisite physical properties for use in the tube 12 of a hose according to the present invention: 75 to 100 parts by weight of acrylonitrilebutadiene copolymer or acrylonitrile-isoprene copolymer having a minimum of 20 percent by weight of acrylonitrile content and 25 to 0 parts by weight of an elastomer selected from the group consisting of styrene-butadiene copolymer, polychloroprene or polyisoprene; and per each 100 weight parts of total elastomer, from about 10 to 50 weight parts and, more preferably, from about 25 to 35 weight parts of adhesive-treated cellulosic fibers having a length range of from about 1 to 3 mm. and a length-to-diameter ratio of from about 100 to 200, an example of such fibers being Santoweb ™ K fibers available from Monsanto Company; from about 10 to 50 weight parts and more preferably from about 20 to 30 weight parts of a reactive phenol formaldehyde resin capable of polymerizing with hexamethylene tetramine, an example of such a resin being Durez ™ 12686 resin available from Hooker Chemical Corporation; from about 0.5 to 5.0 weight parts and, more preferably, from about 1.6 to 2.4 weight parts of hexamethylene tetramine, from about 25 to 100 weight parts and, more preferably, from about 40 to 75 weight parts of a reinforcing filler, for example, ASTM N-330 carbon black and/or hydrated silica; from about 0.5 to 2.0 weight parts of an antioxidant, for example, polymerized 2,2,4-trimethyl-1,2-dihydroquinoline; from about 3 to 10 weight parts of zinc oxide; from about 0.5 to 2.0 weight parts stearic acid; from about 10 to 40 weight parts of rubber plasticizer for example, dioctylphthalate; and a typical sulfur cure and accelerator system such as from about 0.5 to 3.0 weight parts sulfur and from about 0.5 to 2.0 weight parts sulfenamide accelerator, for example N-oxydiethylene-2-benzothiazylsulfenamide.

Other well-known rubber plasticizers can be used, for example, polyethers, adipates, and azelates, depending upon the elastomer or elastomer blends selected. The choice of plasticizer and the level of plasticizer are matters well known to those skilled in the art of elastomer compounding.

Reactive phenolic resins are those capable of polymerizing with a methylene donor, for example, hexamethylene tetramine, tetraethylene tetramine, hexamethoxymethylmelamine.

Reactive phenolic resins suitable for the elastomeric material of the tube 12, preferably either contain hexamethylene tetramine, or the hexamethylene tetramine is added to the compound. The resins should have a melting or softening point below 250 degrees F. Commercial sources include "Arofene" TM resins from Ashland Chemicals, Division of Ashland Oil Company, "Durez" TM resins from Hooker Chemical Corporation, "Alnovol" TM resins from American Hoechst Corporation, Industrial Chemicals Division.

While reactive phenolic resin systems are preferred because of their compatibility with sulfur-base curing systems, other reactive resin systems ("reactive" meaning capable of polymerizing) may be used in place of the phenolic resins, for example:

shellac plus zinc oxide;
resorcinol aldehyde resins plus a methylene donor such as hexamethylene tetramine;
catechol aldehyde resins plus a methylene donor such as hexamethylene tetramine;
monomers containing isocyanurates plus organic peroxides;
monomers containing acrylates plus organic peroxides;
monomers containing allylic double bonds plus organic peroxides.

Representative examples of monomers useful in the practice of the present invention include:

allyl methacrylate
di allyl fumarate
triethylene glycol dimethacrylate
1,3-butylene glycol diacrylate
1,6-hexane diol dimethacrylate
pentaerythritol tetra acrylate
ethoxylated bis phenol A dimethacrylate
trimethylol propane trimethacrylate
tri allyl cyanurate
tri allyl isocyanurate
tri allyl trimellitate
di allyl phthalate Representative examples of organic peroxides useful in the practice of the present invention include:

dicumyl peroxide
di-t-butyl peroxide
2,4 pentane dione peroxide
2,5-dimethyl-2,5-bis(benzoyl peroxy)hexane
n-butyl-4,4-bis(t-butylperoxy)valerate
1,1-di-t-butylperoxy-3,3,5-trimethyl cyclohexane All of the above-listed resin systems are believed to be capable of providing adequate reinforcement of elastomers for use in a hose including a tube 12 according to the invention, although the range given for the reactive resin system in the beforementioned general formulation may not be the range required when other elastomer or resin systems are selected. Determination of the proper amount of reactive resin system is believed to be well within the capability of one skilled in the art of elastomer compounding. Also, as will be revealed in other exemplary formulations provided herein, the use of short discrete fibers is not believed to be requisite although their use is preferred in rotary drilling hose since they provide an extra margin of safety through a different reinforcing mechanism.

The following are examples of compounds which produce the requisite physical properties described hereinbefore. All recipes are given by weight ratios in parts per 100 parts of elastomer.

EXAMPLE I 100 acrylonitrile/butadiene copolymer (32 weight percent acrylonitrile content)
50 ASTM N-330 carbon black
10 hydrated silica
20 di octyl phthalate
1 antioxidant
5 zinc oxide
1 stearic acid
30 adhesive treated cellulosic fibers (Santoweb TM K)
25 phenol formaldehyde resin (Durez TM 12686)
2 hexamethylene tetramine
1.5 sulfur
1 sulfenamide accelerator When the above ingredients were compounded and vulcanized 60 minutes at 295 degrees F., the following physical properties were observed.

| Test Designation | Test Procedure | Value |
|---|---|---|
| Tensile stress at 20% elongation | D-412 | 1000 psi |
| Elongation at rupture | D-412 | 290% |
| Young's modulus | D-1053 | 3700 psi |

EXAMPLE II

The following compound is not recommended for use in the tube of a rotary drilling hose due to low resistance to petroleum base drilling fluids; however, it could be used in a high pressure water hose.

100 styrene butadiene copolymer (23 weight percent styrene)
85 ASTM N-330 carbon black
15 aromatic petroleum base oil
3 antioxidant
3 zinc oxide
1 stearic acid
20 phenolic resin (Alnovol TM VPN-16 from Hoechst)
1.6 hexamethylene tetramine
1.8 sulfur
1.2 sulfenamide accelerator When the above ingredients were compounded and vulcanized 60 minutes at 295 degrees F., the following physical properties were observed.

| Test Designation | Test Procedure | Value |
|---|---|---|
| Tensile stress at 20% elongation | D-412 | 750 psi |
| Elongation at rupture | D-412 | 260% |
| Young's modulus | D-1053 | 6900 psi |

EXAMPLE III 100 acrylonitrile butadiene copolymer (39 weight % acrylontrile)
5 zinc oxide
1 stearic acid
40 ASTM N-550 carbon black
20 trimethylol propane trimethacrylate
4 40 weight percent dicumyl peroxide on an inert filler (Di-Cup TM 40C, available from Hercules, Inc.)

When the above ingredients were compounded and vulcanized 30 minutes at 310 degrees F., the following physical properties were observed.

| Test Designation | Test Procedure | Value |
| --- | --- | --- |
| Tensile stress at 20% elongation | D-412 | 800 psi |
| Elongation at rupture | D-412 | 160% |
| Young's modulus | D-1053 | 2500 psi |

When manufacture of rotary drilling hose or the like is contemplated, an acrylonitrile containing elastomer is highly desirable for the tube. The acrylonitrile content of the elastomer may vary from 17 to 50 percent by weight, depending on the degree of chemical resistance desired, with an acrylonitrile content of at least 20 percent being preferred.

The layer 14 of elastomer in which the steel cables 15 are embedded is chosen to promote adhesion to the steel cables and to the radially inwardly located tube 12 of elastomeric material and the radially outwardly located rubberized textile plies 20. Suitable compositions for this application are well known to one skilled in this art and will not be further described here.

The outer cover 22 of elastomeric material together with the textile plies 20 provide protection for the main reinforcing cables 15.

While certain representative embodiments and details have been shown for the purpose of illustrating the invention it will be apparent to those skilled in the art that various changes and modifications may be made therein without departing from the spirit or scope of the invention.

What is claimed is:

1. A reinforced hose structure comprising from the inside to the outside:
   (A) a tube of elastomeric material having a measured stress of at least 600 psi at 20 percent elongation when measured according to ASTM method D-412 and an elongation at rupture of at least 150 percent when measured according to ASTM method D-412 and a Young's modulus of at least 2000 psi when measured according to ASTM method D-1053;
   (B) two layers of helically extending reinforcing members, the members of adjacent layers of which have an opposite sense orientation relative to the longitudinal axis of the hose, said layers being encapsulated in elastomeric material; and
   (C) a cover of elastomeric material forming the radially outermost surface of the hose.

2. The hose structure of claim 1 wherein the elastomeric material of the tube consists essentially of an elastomer compound with reactive resin system, reinforcing fillers and curatives and whose vulcanizate exhibits an ASTM method D-412 stress of at least about 1000 psi at 20 percent elongation, an ASTM method D-412 elongation at rupture of at least 200% and an ASTM method D-1053 Young's modulus of at least 3500 psi.

3. Hose structure according to claim 1, wherein said tube of elastomeric material comprises elastomer selected from the group consisting of acrylonitrile-butadiene copolymers, acrylonitrile-isoprene copolymers, styrene-butadiene copolymers, polyisoprenes, polychloroprenes or blends of these, and a reactive resin system in an amount sufficient to provide the physical properties listed in claim 1, the reactive resin system being selected from the group consisting of:
   shellac plus zinc oxide,
   resorcinol aldehyde resins plus a methylene donor,
   catechol aldehyde resins plus a methylene donor,
   a monomer selected from the group consisting of:
      allyl methacrylate
      di allyl fumarate
      triethylene glycol dimethacrylate
      1,3-butylene glycol diacrylate
      1,6-hexane diol dimethacrylate
      pentaerythritol tetra acrylate
      ethoxylated bis phenol A dimethacrylate
      trimethylol propane trimethacrylate
      tri allyl cyanurate
      tri allyl isocyanurate
      tri allyl trimellitate
      di allyl phthalate
   in combination with an organic peroxide selected from the group consisting of:
      dicumyl peroxide
      di-t-butyl peroxide
      2,4 pentane dione peroxide
      2,5-dimethyl-2,5-bis(benzoyl peroxy)hexane
      n-butyl-4,4-bis(t-butylperoxy)valerate
      1,1-di-t-butylperoxy-3,3,5-trimethyl cyclohexane.

4. Hose structure according to claim 1 or 8, wherein said tube elastomeric material comprises per each one hundred weight parts of elastomer selected from the group consisting of acrylonitrile-butadiene and acrylonitrile-butadiene blended with styrene-butadiene, from about 10 to 50 weight parts of a reactive phenolic resin, from about 0.5 to 5.0 weight parts of a methylene donor selected from the group consisting of hexamethylene tetramine, tetraethylene tetramine, and hexamethoxymethylamine, from about 25 to 100 weight parts of reinforcing fillers selected from the group consisting of carbon black and hydrated silica, from about 10 to 40 weight parts of rubber plasticizer, from about 0.5 to 2.0 weight parts antioxidant, from about 3 to 10 weight parts zinc oxide, from about 0.5 to 2.0 weight parts stearic acid, from about 0.5 to 3 weight parts sulfur, and from about 0.5 to 2 weight parts sulfenamide accelerator.

5. Hose structure according to claim 4, wherein said tube of elastomeric material further includes per each hundred weight parts of elastomer from about 10 to 50 parts of adhesive treated cellulosic fibers having a length from about 1 to 3 mm. and a length-to-diameter ratio of from about 100 to 200.

6. A hose structure comprising from the inside to the outside:
   a tube of elastomeric material;
   two layers of helically wound steel cables, the cables of adjacent layers being of opposite sense orientation relative to the longitudinal axis of the hose, said cables being embedded in elastomeric material;
   a cover of elastomeric material;
   said tube elastomeric material having a measured stress of at least about 1000 psi at 20 percent elongation when measured according to ASTM method D-412, an elongation at rupture of at least 200 percent when measured according to ASTM method D-412, a Young's modulus of at least about 3500 psi, and a thickness of at least 3/16 inch;
   said tube elastomeric material comprising 75 to 100 parts by weight of at least one of acrylonitrile-butadiene or acrylonitrile-isoprene copolymers having a minimum of 20 percent by weight of acrylonitrile content and 25 to 0 parts by weight of an elastomer selected from the group consisting of styrene-butadiene copolymer, polychloroprene or polyisoprene, and per each 100 weight parts of total elastomer, from about 25 to 35 weight parts of adhesive treated cellulosic fibers having a length range of from about 1 to 3 mm. and a length-to-diameter ratio of about 100 to 200, from about 20 to 30 weight parts of reactive phenol formaldehyde resin capable of polymerizing with hexamethylene tetramine, from about 1.6 to 2.4 weight parts of hexamethylene tetramine, and from about 40 to 75 weight parts of a reinforcing filler selected from the group consisting of ASTM N-330 carbon black and hydrated silica or a blend of these.

7. Hose structure according to claims 1, 2, 3, or 6, wherein elastomer-coated textile fabric layers are interposed between the radially outermost layer of helically wound reinforcing members and the radially outermost surface of the hose.

* * * * *